US011070537B2

(12) United States Patent
Brun et al.

(10) Patent No.: US 11,070,537 B2
(45) Date of Patent: Jul. 20, 2021

(54) STATELESS METHOD FOR SECURING AND AUTHENTICATING A TELECOMMUNICATION (71) Applicant: CASSIDIAN CYBERSECURITY SAS, Elancourt (FR)

(72) Inventors: Paul-Emmanuel Brun, Noisy le roi (FR); Raphaël Cohen, Boulogne Billancourt (FR); Nicolas Petesque, Jouars-Pontchartrain (FR)

(73) Assignee: CASSIDIAN CYBERSECURITY SAS, Elancourt (FR)

( * ) Notice: Subject to any disclaimer, the term of this patent is extended or adjusted under 35 U.S.C. 154(b) by 254 days.

(21) Appl. No.: 15/775,622

(22) PCT Filed: Nov. 10, 2016

(86) PCT No.: PCT/EP2016/077356
§ 371 (c)(1),
(2) Date: May 11, 2018

(87) PCT Pub. No.: WO2017/081208
PCT Pub. Date: May 18, 2017

(65) Prior Publication Data
US 2018/0309740 A1 Oct. 25, 2018

(30) Foreign Application Priority Data
Nov. 13, 2015 (FR) ...................... 1560916

(51) Int. Cl.
*H04L 9/30* (2006.01)
*H04L 29/06* (2006.01)
(Continued)

(52) U.S. Cl.
CPC .............. *H04L 63/08* (2013.01); *H04L 9/006* (2013.01); *H04L 9/3213* (2013.01);
(Continued)

(58) Field of Classification Search
CPC ...... H04L 63/08; H04L 9/3247; H04L 9/3226
See application file for complete search history.

(56) References Cited

U.S. PATENT DOCUMENTS

| 8,621,598 | B2 | 12/2013 | Lai et al. | |
|---|---|---|---|---|
| 2009/0106550 | A1* | 4/2009 | Mohamed | H04L 63/045 713/156 |
| 2009/0235349 | A1* | 9/2009 | Lai | H04L 9/3271 726/14 |

OTHER PUBLICATIONS

International Search Report as issued in International Patent Application No. PCT/EP2016/077356, dated Mar. 13, 2017.
(Continued)

*Primary Examiner* — Wasika Nipa
(74) *Attorney, Agent, or Firm* — Pillsbury Winthrop Shaw Pittman LLP (57) ABSTRACT

A method of communication between two communicating entities, a first communicating entity generating a data message including useful data and an authentication header, the method including: generating a message identifier from a given parameter and a date and inserting the identifier into an authentication header; inserting a plurality of authentication data including at least one user identifier and one equipment identifier into the authentication header; determining and inserting a security profile into the authentication header defining the conditions: of encryption of the useful data of at least the transmission of the message by the first communicating entity; of generation of a data signature of the message and of the format of the generated signature, and inserting the useful data into the message to be transmitted.

13 Claims, 3 Drawing Sheets (51) Int. Cl.
*H04L 9/00* (2006.01)
*H04L 9/32* (2006.01)

(52) U.S. Cl.
CPC .......... *H04L 9/3226* (2013.01); *H04L 9/3236* (2013.01); *H04L 9/3247* (2013.01); *H04L 9/3249* (2013.01); *H04L 63/126* (2013.01)

(56) References Cited

OTHER PUBLICATIONS

Shang, J., Huawei Technologies Co, et al., "Secure DHCPv6 Using CGAs; draft-ietf-dhc-secure-dhcpv6-07.txt," Internet Engineering Task Force, ITEF, Standardworkingdraft, Internet Society, Sep. 2012, 18 pages, URL: <https://datatracker.ietf.org/doc/html/draft-ietf-dhc-secure-dhcpv6-07>.

Droms, R., et al., "Dynamic Host Configuration Protocol for IPv6 (DHCPv6)•, draft-ietf-dhc-dhcpv6-27.txt," JCT-VC Meeting•, 96, MPEG Meeting, Oct. 2003, 92 pages, vol. dno, No. 27, URL: <https://datatracker.ietf.org/doc/html/draft-ietf-dhc-dhcpv6-27>.

* cited by examiner

STATELESS METHOD FOR SECURING AND AUTHENTICATING A TELECOMMUNICATION

CROSS-REFERENCE TO RELATED APPLICATIONS

This is the U.S. National Stage of PCT/EP2016/077356, filed Nov. 10, 2016, which in turn claims priority to French Application No. 1560916, filed Nov. 13, 2015, the entire contents of all applications are incorporated herein by reference in their entireties.

FIELD

The field of the invention relates to securing communications between two communicating entities, such as a client and a server having network interfaces. More particularly, the invention pertains to secure communications not requiring the management of states or the establishment of a communication session that it is wished to secure. Finally, the field of the invention relates to telecommunications comprising an authentication enabling the establishment of secure ad hoc communications offering architectural flexibility while limiting the use of an authentication third party.

PRIOR ART

In the field of web services, the REST type software architectural style, of which the acronym designates "Representational State Transfer" has become widespread on account of its simplicity of implementation and integration in distributed systems. In a web application based on a REST type architecture, a client station calls on resources spread out on one or more server stations by means of requests using for example the http protocol, of which the acronym designates "Hypertext Transfer Protocol", and while referring to an URI, of which the signification is "Uniform Resource Identifier", representing the unique address of the resource on the network. In response to this request, the server sends back to the client station the requested resources generally in XML or JSON format. One of the essential characteristics of REST architecture is to proscribe at the level of the server any context of communication with the client station beyond the duration of reception of the request. This stateless communication mode guarantees that the server station has scalability. Indeed, said server station can immediately release after the reception of the request its resources necessary for the communication with the client station, thereby making them available for a new communication and avoiding the overloading of said system resources.

In the field of securing telecommunications, different techniques exist. All are based on an authentication mechanism making it possible to secure exchanges between two communicating entities.

Among the solutions not involving the implementation of a session between the two entities, two authentication methods are widespread. Among these methods, all engage the exchange of at least one secret between the server and a client. The secret may take the form of a password or a key. In the remainder of the description, secret will designate one or the other of these cases.

A first authentication method is based on the exchange of an API key, that is to say a secret shared between two communicating entities. In this case, generally a secret such as a password is defined on the server side and is transmitted by the request destined for a client. This password is then exchanged at each request transmission between the communicating entities.

One problem of said solution is that an interception of the request enables a third party to recover the shared secret and thereafter access the data server. A risk is that access to the server is usurped by an unauthorised third party which can then share sensitive data.

A second authentication method is based on the establishment of an API key signature. A secret is then shared initially between two communicating entities, for example, by an enrolment phase between the two entities. The secrets are next stored on the client side and on the server side. The secret is then used to sign the messages which are next transmitted. One advantage is that the secret is not shared systematically during the transmission of each message between two communicating entities. This solution limits the possibilities of interception of the secret. The signature makes it possible to authenticate the messages once received with the secret which is stored in the communicating entity, but which is not transferred during the exchanges.

One problem of said solution is that the passwords/secrets have to be stored in the entities. Yet, generally, the secret is stored plaintext, that is to say in a non-encrypted manner. A danger is that a usurpation of the database of the server by a third party makes it possible to access the secrets of all the clients.

Among solutions involving the implementation of a session between the two entities, two authentication methods are widespread.

A first method is based on SAML technology designating "Security Assertion Markup Language". This method is based on the definition of an authentication third party such as an authentication server. This solution involves the implementation of a PKI key management system, the acronym designating "Public Key Infrastructure". This method makes it possible to obtain good security of data exchanges between communicating entities. However, it is difficult to implement simply because an authentication third party has to be parameterised. Moreover, it is expensive and requires the establishment of a session between the entities and/or exchanges of certificates. Moreover, the XML protocol is generally employed in this method. One drawback is that the security header of this protocol is very verbose and is not adapted to low bandwidth communications.

A second solution is based on the HTTPs protocol which is also based on a PKI key management system and on the exchange of certificates. This solution also offers good security of data exchanges between communicating entities. On the other hand, this solution is expensive and difficult to implement. Moreover, it involves a prior mechanism of exchange of keys with an authentication third party. These methods may be rolled out on broadband networks but on more restricted networks, they can encounter several limitations during the implementation of the exchanges.

Moreover, a problem of a PKI key management system is that it is difficult, or even impossible, from the viewpoint of the server to suspend an equipment for a determined or undetermined duration. Since the authentication third party has rights, it is difficult to have available an autonomy of management of revocations or suspensions of rights from the viewpoint of the communication server.

The U.S. Pat. No. 8,621,598 B2 describes a mechanism based on a REST architecture, on the other hand the solution imposes the definition of a session token which is transmitted between the communicating entities. In this solution, the authentication token is used by the server to exchange with an authentication server authorising or not the transfer of data between the client and the server. This solution involves the implementation of an authentication server comprising a database in which the private keys of client equipment are stored.

There exists a need to define a secure method of communication for the exchange of data between two communicating entities that is simple to implement, which does not rely on a third party authentication server and which does not involve the definition, the implementation and the management of a session between the communicating entities.

Among the needs for securing such data exchanges, there exists a need to define a method of communication that is robust to replay type attacks, of MITM type, designating "man in the middle" attack, or instead an "eavesdropping" type attack.

SUMMARY OF THE INVENTION

The invention aims to overcome the aforesaid drawbacks.

The invention makes it possible to offer a compromise between a sufficient level of security to implement between communicating entities and a simplicity of implementation of a certain level of security enabling stateless exchanges between said entities. The invention makes it possible to dispense with exchanges of certificates or the establishment of a session. Moreover, the method of the invention makes it possible to dispense with an authentication third party, such as an authentication server.

One object of the invention relates to a method of communication between two communicating entities, a first communicating entity generating a data message comprising the useful data and an authentication header, said method comprising:
  generating a message identifier from a given parameter and a date and inserting the identifier into an authentication header;
  inserting a plurality of authentication data comprising at least one user identifier and one equipment identifier into the authentication header;
  determining and inserting a security profile into the authentication header defining the conditions:
    of encryption of the useful data of at least the transmission of the message by the first communicating entity;
    of generation of a data signature of the message and of the format of said generated signature;
  and inserting the useful data into the message to be transmitted.

One advantage of the invention is to make it possible to secure a data link between two communicating entities without having to implement an authentication third party, such as an authentication server storing the authentication data of the communicating entities. In the method of the invention, only the communicating entities exchanging data implement the security mechanisms of the data link. Moreover, the method of the invention does not require session or state management between the two communicating entities. Each message comprises the identification, authentication and security elements ensuring a reliable link.

According to one embodiment, the data set to sign comprises a combination of the following data:
  the message identifier;
  the user identifier;
  a password of a user account;
  the equipment identifier;
  the security profile;
  an information of headers or of a message data field representative of the useful data transfer protocol;
  the useful data.

According to one embodiment, the first communicating entity comprises a memory for storing a public key of a second communicating entity, the security profile comprising:
  a first parameter indicating the presence or not of an encryption of the useful data carried out from the public key of the second communicating entity and;
  a second parameter indicating the presence or not of a signature of a data set to sign.

According to one embodiment, the first communicating entity comprises a memory for storing a public key of a second communicating entity, the security profile comprising:
  a first parameter indicating the presence or not of an encryption of the useful data carried out from a symmetric key and if need be of the presence of an encryption of the symmetric key from the public key of the second communicating entity and;
  a second parameter indicating the presence or not of a signature of a data set to sign.

According to one embodiment, the security profile comprises:
  a third parameter indicating the presence or not of an encryption carried out from the public key of the first communicating entity either of the useful data or of an symmetric key and;
  a fourth parameter indicating the presence or not of a signature of a data set to sign,
  of at least one message having to be transmitted by a second communicating entity in response to a message received from the first communicating entity.

According to one embodiment, the second communicating entity, on receiving a message from the first communicating entity, decodes the authentication header in such a way as to:
  control the message identifier to determine if the message has been transmitted in a predefined time lapse;
  control the user identifier and the equipment identifier by comparing the value of these parameters with the data stored in a memory of the second communicating entity to determine if the equipment or the user has been suspended or revoked;
  control the encryption parameter of the security profile of the received message to decrypt if need be the useful data with the private key of the second communicating entity;
  control, if need be, the signature parameter of the security profile of the received message to verify if need be the signature by means of the public key of the first communicating entity.

According to one embodiment, the server comprises means for accessing the memory storing the data corresponding to the client identifiers and to the equipment identifiers in such a way as to revoke or suspend one or more equipment or client(s).

Another object of the invention relates to a method for generating an enrolment request by a first communicating entity destined for a second communicating entity. The method for generating an enrolment request comprises:
  Activating the enrolment procedure;
  Generating an enrolment request comprising an equipment identifier, a user identifier, a user password and a public key of the first communicating entity;

Encrypting the request with a public key of the second communicating entity and transmitting the enrolment request by means of a communication interface destined for the second communicating entity.

According to one embodiment, the method for generating an enrolment request by a first communicating entity comprises beforehand:
Creating a user account comprising an identifier and a password;
Recording the data of said user account in a memory of the second communicating entity;
Acquiring a public key of the second communicating entity for which the enrolment procedure is engaged from the first communicating entity;
Generating a pair of asymmetric keys of the first communicating entity.

According to one embodiment, the method of enrolment comprises the following steps carried out by the second communicating entity:
Receiving an enrolment request generated by a method for generating an enrolment request of the invention;
Decrypting the data of the enrolment request by means of a private key of the second communicating entity;
Comparing the received user identifier and the received user password with the data of client accounts stored in a memory of the second communicating entity;
Recording the equipment identifier in a memory of the second communicating entity;
Recording the public key of the first communicating entity associated with the equipment identifier in a memory of the second communicating entity.

According to one embodiment, the second communicating entity implements the following steps of the method of enrolment:
is controlling a current date with a reference date;
generating a message destined for the first communicating entity comprising a specific code indicating that a pair of asymmetric keys has to be renewed;
receiving a new enrolment request generated by the first communicating entity according to the method of enrolment of the invention.

According to one embodiment, the method of communication comprises beforehand the execution of a method of enrolment of the invention.

Another object of the invention relates to a communicating entity comprising at least one memory, one calculator and one communication interface for the execution of the method of communication of the invention and/or of the method of enrolment.

Another object of the invention relates to a computer programme comprising a set of instructions for the implementation of the method of communication. In this embodiment, a physical support, such as a memory, makes it possible to record the instructions and a calculator makes it possible to implement the steps of the method. In the latter case, the computer programme is configured to execute the method of the invention on a computer, a tablet, a smartphone or more generally an intelligent electronic equipment comprising a communication interface.

According to one embodiment, the computer programme is configured to form an API, designating "Application Programming Interface". The latter may be implemented in a computer programme within a method for managing a communication interface of an equipment.

According to one embodiment, a computer programme is also designed to comprise instructions and means for the execution of the method of enrolment. Identically, this computer programme may be designed to form an API.

BRIEF DESCRIPTION OF THE FIGURES

Other characteristics and advantages of the invention will become clear from the detailed description that follows, with reference to the appended figures, which illustrate.

DESCRIPTION

The invention relates to securing and authenticating communications between two communicating entities. The description details an embodiment in which the two entities concern respectively a client and a server. The present invention targets a method of enrolment between at least two entities and a method of communication between at least said two entities.

Client

A client according to the invention comprises at least one calculator, one memory and one communication interface. According to one embodiment, the client is a computer, a tablet, a smartphone or instead an industrial equipment of smart box type or any electronic equipment dedicated for the application aiming to transfer data in a secure manner. The client comprises an operating system and a set of functions making it possible to offer to a user a set of services within a network.

The client is thus associated with an equipment. Reference will be made, in the description that follows, equally well to an equipment or to a client, when the client is a communicating entity having a configuration enabling it to be identified within a network. The client thus comprises an identifier noted EQ_ID. The client equipment is thus indiscriminately noted $EQ_A$, $EQ_B$ or instead CLIENT in a general manner.

Consequently, the client is generally an entity that is capable of initiating a communication by an enrolment procedure, which has the objective of securing a transfer of data between said client and a server.

Server

A server according to the invention comprises at least one memory and one calculator as well as one communication interface. According to one embodiment, the server is a computer connected to a network, such as the internet network. According to one embodiment, the server is configured to receive messages coming from different clients and to store the data sent by different clients. According to one embodiment, the server stores in a database the data of a plurality of users of which the client accounts and associations between each client and user equipment EQ. Moreover, the server stores cryptographic data.

The server is an equipment that makes available a public key KSpub for one or more client(s). This public key makes it possible to encrypt messages transmitted by the client for the server.

The data server of the invention is a server offering services to a client. The server of the invention is thus not an authentication server fulfilling exclusively the functions of authentication in the sense of an authentication third party coupled with another data server. One of the objectives of the invention is to make it possible to establish secure communications between at least one client and one data server offering services involving a secure connection.

Client Account

In the description that follows a user is identified by an identifier USER_ID. The user is capable of defining an account and referencing it with the server, for example, by means of a remote link making it possible to record the data of its account. The account comprises at least one identifier USER_ID and one password USER_MDP which is associated with the identifier USER_ID.

The method for exchanging data between two communicating entities thus comprises beforehand a step of recording a user on the entity defining the data server.

Management of Asymmetric Keys

Figure 1:
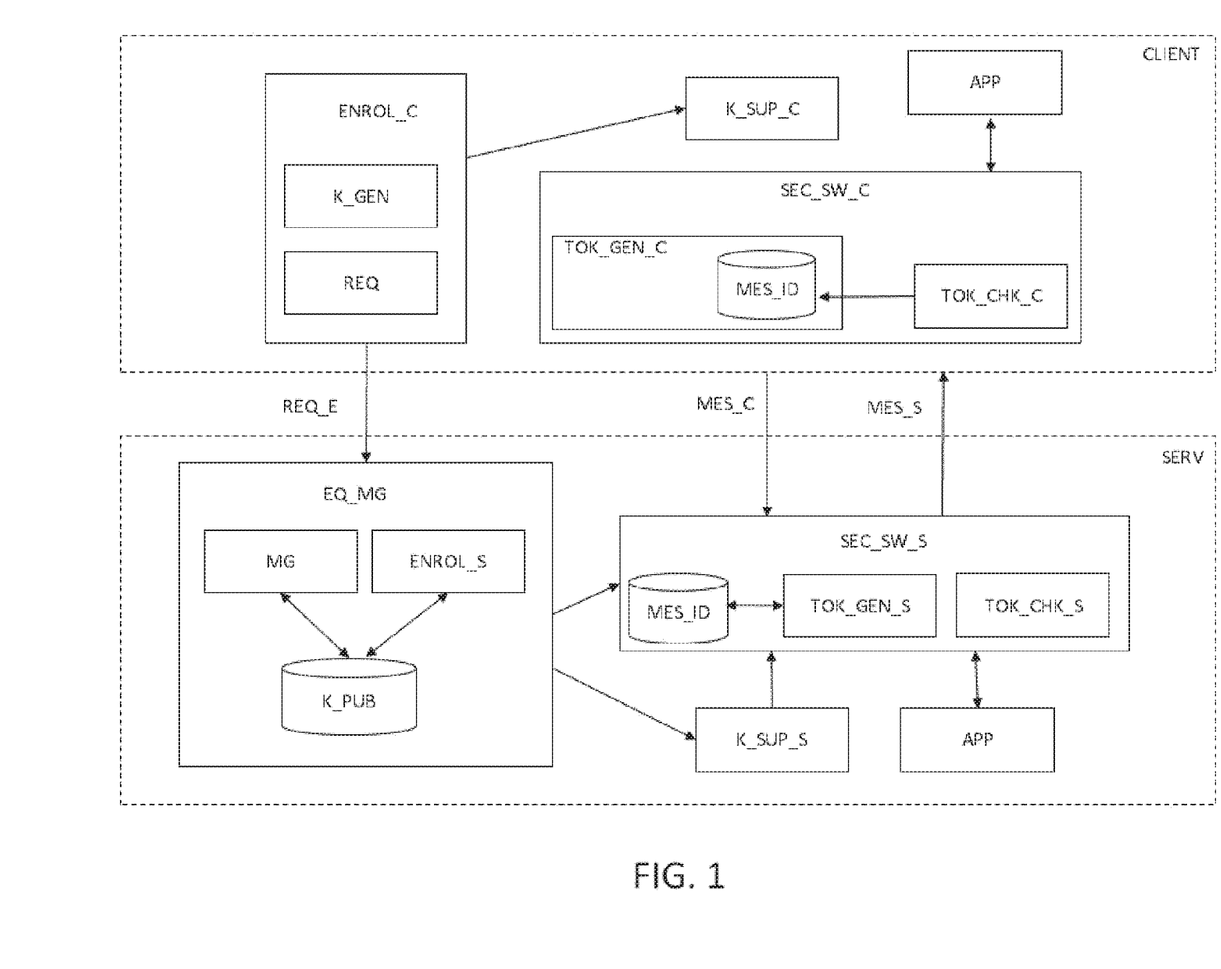
FIG. 1: a block diagram of the main elements of the system of the invention implementing the methods of the invention.

The method of authentication of the invention is based on generating a pair of asymmetric cryptographic keys and the exchange of public keys between the communicating entities. A public key Kpub and a private key Kpriv are generated by an equipment, this step is noted K_GEN in FIG. 1. This function may be realised by a software or hardware cryptographic component of the equipment. Only the public keys are exchanged between the communicating entities:

the private key of each client KApriv is stored in a memory of a client equipment or in a dedicated security component such as for example a TPM designating "Trusted Platform Module", and;

the private key of a data server KSpriv is stored in a memory of the server.

The private keys KApriv, KSpriv are not exchanged between the communicating entities during the execution of the methods of the invention.

In FIG. 1, on the client side, the keys are managed by a cryptographic component noted K_SUP_C. This component makes it possible to store the private key KApriv and the public key KApub of the client as well as the public key of the server KSpub acquired during a prior step.

FIG. 1 represents, moreover, a cryptographic component on the server side K_SUP_S which makes it possible to store the pair of asymmetric keys of the server: KSpriv, KSpub.

In the present invention, each equipment is associated with a single private key of an equipment KApriv which may potentially be renewed. A private key of an equipment KApriv is associated with an equipment $EQ_A$ such as for example a smartphone, a tablet, a PC or an industrial equipment of smart box type such as an electrical counter for example.

A user is associated with one or more equipment $EQ_A$, $EQ_B$, etc.

Method for Generating an Enrolment Request

Enrolment is a preliminary step to any transmission of useful data between two communicating entities establishing a secure communication according to the method of communication of the invention. Enrolment makes it possible to exchange data between the communicating entities that are going to make it possible to make data exchanges secure.

When a client carries out an enrolment with a server, it initiates this procedure by generating a request REQ_E. One advantage is that this request does not comprise the transmission of a private key of the equipment. The client comprises a component noted ENROL_C making it possible to implement the enrolment mechanism from the viewpoint of the server, notably to generate the enrolment requests REQ_E.

From the viewpoint of the server, a component noted EQ_MG controls the management of equipment and users and processes the enrolment requests REQ_E, notably by verifying the validity of the data of the request. When an equipment is enrolled by a server, its identifier is stored in a memory of the server. The server is then capable of associating a client with a set of associated equipment which have been enrolled by the user. On the server side, the function managing the equipment and the users is noted MG in FIG. 1 and the function processing the enrolment requests is noted ENROL_S. A memory makes it possible to store the public keys of the equipment as well as the passwords of the client accounts. This memory is noted K_PUB in FIG. 1.

The method of enrolment of the invention is based on the creation of a client account by a user of which the data are stored in a memory of a data server, the data server SERV defining one of the communicating entities of the invention.

Figure 2A:
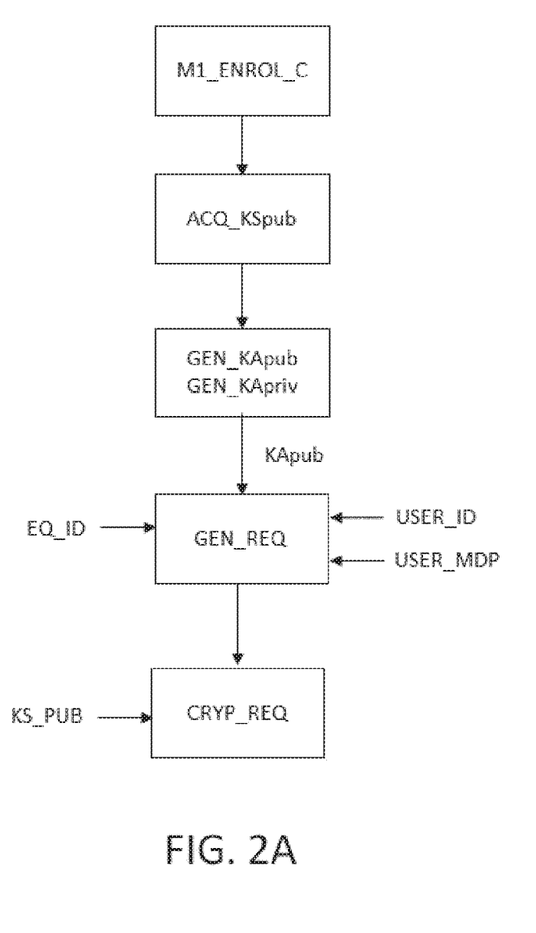
FIGS. 2A, 2B: the main steps of the methods of the invention for generating an enrolment request and receiving the enrolment request.

FIG. 2A represents the main steps of a method for generating an enrolment request REC_E engaged by the method for generating an enrolment request M1_ENROL_C carried out by an equipment such as a client.

Before communicating with a server according to the method of communication of the invention, each client accomplishes a phase of enrolment according to the method for generating an enrolment request of the invention.

The method M1_ENROL_C comprises a step activating this method which also corresponds to the eponymous step of the method M1_ENROL_C.

The method for generating an enrolment request M1_ENROL_C by the client comprises a step corresponding to the acquisition of a public key of a server SERV, noted ACQ_KSpub. According to the embodiments of the invention, the step of acquisition of the public key of the server KSpub may be considered as forming part of the method of enrolment or it may be considered as a prior step in which the public key of the server KSpub has been acquired by a user before it engages the enrolment. In the latter case, the acquisition of the public key of the server KSpub is not comprised in the method of enrolment.

This step may be carried out by manual input if a user copies a public key of a server KSpub in a client equipment interface. Moreover, the public key of the server KSpub may be received from a third party equipment or instead directly from the server SERV forming one of the two communicating entities of the invention. In the latter case, the public key of the server KSpub may be received, for example, after the creation of a user account with the server SERV. According to other exemplary embodiments, the acquisition of the public key of the server KSpub may be generated by means of a file such as an image, a captcha code, a bar code or a 2D code, such as a QR code. The acquisition of the public key of the server KSpub by the client may be carried out, in the latter case, by reading of the code or the image comprising said key by means of the equipment. The equipment comprises in the latter case image capturing means such as an optical sensor.

According to one embodiment, when the acquisition of the public key KSpub of the server has already taken place, the public key of the server is considered as already stored in a memory of the equipment. The step of acquisition of the public key of the server KSpub of the method may thus correspond to the acquisition of said key from the memory of the equipment when it has already been acquired by the server. When the equipment does not have the public key of the server, the acquisition comprises the operation aiming to recover this public key KSpub from the server. This operation may result from an operation aiming to establish a dialogue between the client and the server. According to another embodiment, the user recovers the public key from the server without carrying out an exchange between the client and the server, for example by manual recopying of the key in a client interface.

Each equipment that carries out an enrolment with a server has stored a public key KSpub of said server. The public key of the server KSpub makes it possible to encrypt the enrolment request as well as the messages transmitted during the method of communication of the invention.

According to one embodiment of the invention, the method for generating an enrolment request by the client comprises a step of generating a public key of an equipment EQa, noted KApub, and a private key of an equipment noted KApriv. The generation steps are respectively noted GEN_KApub and GEN_KApriv in FIG. 2A, they are moreover generally generated at the same time. In the latter case, a pair of keys is generated jointly. When the step of generating the pair of asymmetric keys has been carried out beforehand, the method for generating an enrolment request aims to extract the public key of the equipment KApub from a memory of the equipment to include it in the request. In the latter case, according to one embodiment, the method for generating an enrolment request uniquely comprises the acquisition in a memory of the equipment of the public key of the client and not its generation at each enrolment.

The method for generating an enrolment request REQ_E by the client thus comprises the generation of an enrolment request REQ_E destined for the server SERV. This step is noted GEN_REQ in FIG. 2A. This step is carried out by a calculator of the client noted in FIG. 1: "REQ". It comprises the recovery of a certain number of data stored in a memory of the client and the generation of the request REQ_E comprising said recovered data. The steps of recovering certain data are also carried out during the method of communication of the invention. Notably, the equipment identifier and the user identifier are used at each transmission of new messages by application of the method of communication of the invention. Some of the steps that follow are thus common to the method of enrolment and to the method of communication of the invention.

According to one embodiment, the calculator recovers the data from at least one memory of the client, for example stored in a database of which an equipment identifier noted EQ_ID. Moreover, the calculator recovers the user identifier USER_ID. The user identifier USER_ID may be:
 either recovered by the calculator from a memory in which a user has stored its identifier beforehand;
 or recovered from a user interface input control in which the user indicates its identifier without it being stored beforehand in the equipment.

The calculator also recovers a user password USER_MDP. The user password USER_MDP may also either be recovered from a memory of the equipment EQa in which it has been stored beforehand by a user of the equipment EQa, or recovered from a user interface input control. This step is notably executed for the method of enrolment.

Moreover, the calculator recovers the public key of the equipment KApub from the equipment EQa which is stored in a memory of the equipment EQa after its generation or its recovery from an interface. The public key of the client is transmitted during the method of enrolment, but it is not necessarily transmitted during the method of communication of the invention. It is precisely an advantage of the invention of not retransmitting the public key of the equipment at each transmission of new messages.

The enrolment request thereby generated thus comprises the following data:
 the user identifier, USER_ID;
 the password of the client, USER_MDP;
 the equipment identifier, EQ_ID;
 the public key of the client, KApub.

The method for generating an enrolment request comprises a step of encryption of the request, noted CRYP_REQ in FIG. 2A, by the public key of the server KSpub. This public key has been acquired beforehand by the client and may be used to encrypt the enrolment request. Consequently, the server will be able to decrypt the request thereby encrypted thanks to its private key KSpriv.

According to an alternative embodiment, the public key of the server KSpub is used to encrypt a symmetric key. This solution is more efficient in terms of calculations than an algorithm of encryption of the message carried out from asymmetric keys. This solution makes it possible to encrypt a shorter message with an asymmetric key which comprises the symmetric key. On reception, the private key KSpriv of the server makes it possible to decrypt the symmetric key and to decode the encrypted message with the symmetric key thereby decrypted. This alternative may be implemented during the method of enrolment and/or during the method of communication of the invention.

The method of enrolment is carried out prior to the transmission of messages according to the method of communication of the invention.

The enrolment may be carried out once and for all from the client equipment or from any equipment making it possible to establish a link with the data server.

According to another exemplary embodiment, the enrolment may be a preliminary step to the transmission of a message that directly succeeds the step of secure transmission of messages.

Reception of the Request by the Server

Figure 2B:
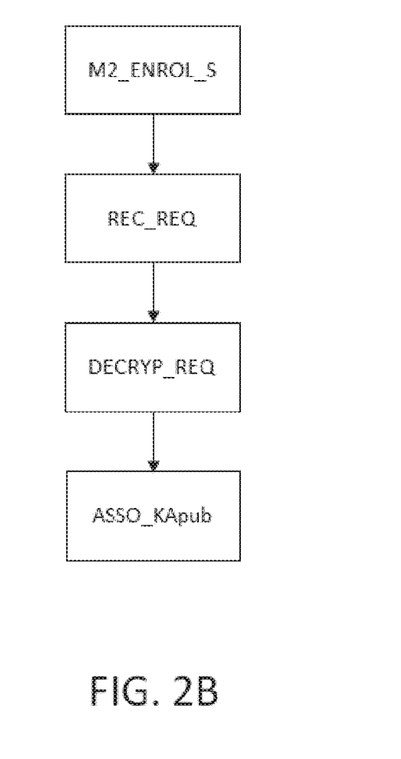

The invention relates to the processing M2_ENROL_S of an enrolment request REQ_E received by the server. When the server receives a new enrolment request REQ_E, it ensures its reception REC_REQ by means of a communication interface, such as for example a network card. The server engages a step of decryption of the data, noted DECRYPT_REQ, by means of its private key KSpriv.

The decrypted data are next extracted and stored in a memory of the server. The server carries out a control of the user identifier USER_ID and of the user password MDP_USER which are data already recorded in a memory of the server during the creation of the client account on the server SERV.

When the data of the user account received correspond to the data already recorded, the server records the data of the equipment of which its identifier EQ_ID and the public key of the equipment KApub in a memory.

The server SERV then performs an association ASSO_KApub between the data of the equipment and a user account. Thus, a user may be associated with different equipment of which the public keys are known by the server.

Key Renewal

According to one embodiment, a key renewal mechanism engages the renewal of a pair of asymmetric keys: a private key of the equipment KApriv and a public key of the equipment KApriv are renewed.

The public key of the equipment KApub may again be transmitted to the server. To do so, a method of enrolment may be reiterated, for example on demand of the server or after a certain time lapse. According to an exemplary embodiment, the server can transmit an error message following reception of a message from the client for which the public key is no longer valid. The error message may comprise a rejection code indicating that a method of enrolment has to be renewed with a new public key.

Identically, when it is the public key of the server that is modified, an error message may indicate to the client that it is necessary that said client recovers a new public key from the server.

This mechanism may be engaged automatically and in a transparent manner vis-à-vis a user. The equipment then renews a new private key KApub which is stored locally and renews a new public key KApub associated with this private key. The public key of the equipment is then sent by a new enrolment request to the server.

Transmission of Useful Data

The method of communication of the invention makes it possible to transmit and receive data in the form of messages between two communicating entities, these messages are noted MES_C and MES_S in FIG. 1. The method of the invention makes it possible to exchange communications in a secure manner by the definition of messages of which the security is "self-supporting", that is to say that each message exchanged comprises its own security information making it possible to process and to encrypt the message sent. The invention does not require that an establishment of a session between the two communicating entities ensures a secure channel between said two entities.

The invention thus comprises two mechanisms making it possible to define a secure method of communication between two communicating entities:
 is an enrolment mechanism and;
 a mechanism for generating an authentication header of the data messages transmitted between the two entities.
 The invention relates to each of these two mechanisms.

The description that follows describes one embodiment in which the client transmits a message to the server, said message being verified by the server. The invention also relates to the reverse exchanges of messages, of which notably a message of which the header is generated by the server and of which the verification is carried out on reception by a client. According to one embodiment, the secure method of communication of the invention is symmetrical between a client and a server. The method of communication thus applies reciprocally to a transmission from a client to a server or from a server to a client.

In FIG. 1 may be noted the components making it possible to process the transmission and reception functions of the methods of the invention: SEC_SW_C for the client and SEC_SW_S on the server side.

Authentication Header of a Message

Consecutively to the enrolment step, the invention implements a method of communication making it possible to transmit secure messages by the generation of an authentication header, noted TOKEN. The method of communication could, in another alternative embodiment, be carried out independently of the prior execution of a method of enrolment. This is for example the case when the data exchanged in the method of enrolment would be defined by a user in each equipment, such as for example the exchange of public keys and equipment and user identifiers.

The authentication header TOKEN is generated by a component of the client noted in FIG. 1: TOK_GEN_C. On the server side, the component noted TOK_CHK_S verifies the authentication header received from the client. Conversely, when a message is transmitted by the server destined for a client, a component noted TOK_GEN_S, on the server side, makes it possible to generate the authentication header of the message and a component noted TOK_CHK_C, on the client side, makes it possible to verify the authentication header of a message transmitted by the server destined for the client.

The authentication header TOKEN of the transmitted messages comprises different data fields of which the equipment identifier EQ_ID, the user identifier USER_ID, the identification of the message, MES_ID, a security profile PRO_SEC and a signature if need be.

The authentication header TOKEN may be, for example, integrated in the headers of the transport protocol used depending on the communications made, such as a header of the http protocol for example.

According to one embodiment, the authentication header is added to the list of headers of the applicative transport protocol used by the application. In the example of the HTTP protocol, according to one embodiment, the content of the authentication header generated by the present invention is associated with the "Authorisation" header: of the HTTP/1.1 protocol according to the RFC [2616].

Message Identifier, MES_ID

According to one embodiment, the calculator recovers a message identifier MES_ID that is generated by a message counter which generates message identifiers. FIG. 1 represents the components making it possible to generate and to process message identifiers, they are also noted MES_ID.

According to one embodiment, the message counter calculates the MES_ID from a variable, that is to say from a random parameter and a date. The variable makes it possible to define a unique identifier of the message.

When the identifier of the message MES_ID is calculated notably from a date defined by a local clock of the equipment, the identifier MES_ID comprises information relative to the date of generation of the message which could be decoded on reception by the server.

According to an alternative embodiment, the MES_ID may be generated with a non-random parameter and a date.

The message identifier MES_IS may for example be calculated "on the fly", that is to say in real time by a calculator of the communicating entity. The message identifier thereby calculated is attributed to a message.

Security Profile

The security profile PRO_SEC makes it possible to define an algorithm that will be used to sign or to encrypt the content to be transmitted and to indicate and to define if the response transmitted by the server also has to be encrypted and according to which algorithm.

The different communicating entities, such as a server and a plurality of clients may comprise a configuration of predefined security profiles. Each predefined profile may be activated to define a manner of transmitting and receiving data with another entity.

According to one embodiment of the invention, four security profiles are predefined.

A first profile corresponds to the activation of a security parameter P1 incorporated in the authentication header TOKEN of the message to be transmitted by the client to the server. This parameter indicates the presence of an encryption of the transmitted useful data. Thus, the server receiving this parameter is capable of implementing a decryption of the transmitted data when the latter are encoded.

A second profile corresponds to the activation of a security parameter P2 incorporated in the authentication header of the message to be transmitted by the client. The parameter P2 makes it possible to indicate that the authentication header is signed. The signature is in this case carried out by the client thanks to the private key of the client KApriv. According to one embodiment, the signature is incorporated in the authentication header.

A third profile corresponds to the activation of a security parameter P3 incorporated in the authentication header TOKEN of the message to be transmitted by the client to the server. This parameter indicates that the useful data of the return message(s) transmitted by the server to the client have to be encrypted.

A fourth profile corresponds to the activation of a security parameter P4 incorporated in the authentication header TOKEN of the message to be transmitted by the client. The parameter P4 indicates to the server that it has to sign the authentication headers of the messages that it will transmit in return of the message transmitted by the client.

Thus, if the parameters P3 and P4 are activated by the client in the messages transmitted to the server, the server will encrypt the useful data and will sign the authentication header TOKEN of the messages transmitted in its turn to the client in response to the message(s) received from the latter.

The server may thus indicate in its turn the value of the parameters P1, P2, P3 and P4 to inform the client of its mode of encryption of the data as well as the presence of a signature.

This configuration has the advantage of making it possible to establish communications of which the security is entirely self-supporting between two communicating entities.

When the method is implemented symmetrically in the client and the server, the authentication header of the response of the server thus also comprises a security profile comprising a parameterisation P1, P2, P3, P4. In this case, the signature is generated from the private key of the server KSpriv and the encryption of the useful data is carried out with the public key of the client KApub.

The different security profiles make it possible to adapt the level of security of data exchanges between the communicating entities according to the context of data exchanges or the type of data to exchange.

According to a particular embodiment of the invention, the security profiles PRO_SEC use a fifth security parameter P5 representative of the format of the signature used for the authentication header. This parameter makes it possible to define the use or not in the signature of;
one or more data fields of the authentication header TOKEN of the message;
the useful data and;
transport protocol data such as the headers of the transport protocol, or other data fields such as the field of the REQUEST_LINE type of the http protocol.

According to another embodiment, the security parameters P2 and P4 indicate directly the applied signature format.

The format of a signature is defined by at least one of any of these data or a combination of said data:
The hashing function algorithm;
The encryption algorithm;
The type of key;
The indication of the data to sign such as for example the data fields of the authentication header as well as the useful data and optionally data relative to the data fields of the transport protocol used.

When an entity receives a security profile that it does not know, that is to say which is not predefined in a memory of the entity, then a default profile may be used. According to another embodiment, the step of enrolment may comprise the transmission of the definition of a security profile either in the data authentication header TOKEN, or in the payload of the transmitted data. On reception, an entity may then record the definition of the new security profile and use it to deploy a strategy of encryption of the transmitted messages and of decryption of the received messages.

Moreover, the encryption profile comprises the designation of a signature generation algorithm such as for example RSA-SHA256 and if need be the designation of a data encryption algorithm, such as for example AES.

The security profile thus comprises an indication of the presence of a signature and the presence of an encryption of the data and if need be, the security profile comprises the designation of the algorithms used to generate the signature or to encrypt the data.

Signature

The authentication header TOKEN also comprises a signature of the data transmitted in the header and/or in the message body. A signature is created by means of a signature generation algorithm. The signature is achieved by means of a private key of the signing communicating entity. If the client signs the authentication header of a transmitted message, the signature is done from the key KApriv, that is to say the private key of the equipment. According to one exemplary embodiment, an algorithm based on a RSA SHA256 method may be implemented by the invention to generate the signature. It will be recalled that the acronym SHA designates: "Secure Hash Algorithm" and corresponds to a cryptographic hashing function. RSA is an asymmetric cryptographic algorithm using a pair of asymmetric keys. The two algorithms may be combined in a single encryption algorithm.

According to another exemplary embodiment, the ECDSA algorithm designating "Elliptic Curve Digital Signature Algorithm" may be used according to the method of the invention. It is a digital signature algorithm with public key.

The signature generation algorithm may be automatically determined as a function of the equipment of the client or of its operating system. One advantage is using resources that already exist on an equipment.

According to one embodiment, when a field of the authentication header TOKEN comprises the generated signature, another field may be entered in the header to designate the algorithm making it possible to generate the signature and/or the encryption algorithm of the useful data. On reception, the data server could decode the signature thanks to the choice of the correct algorithm for decoding the signature.

The signature is generated from data relative notably to the client and to the equipment.

According to one exemplary embodiment, the signature is generated from the data: MES_ID, EQ_ID, USER_ID, PRO_SEC and from the content of the message.

According to another embodiment, the signature is generated from the useful data of the message. This makes it possible to generate a signature of the authentication data MES_ID, EQ_ID, USER_ID, of the security profile PRO_SEC, and of the content of the message DATA. The data, when they are signed, may correspond to encrypted useful data or to non-encrypted useful data.

According to one embodiment, the signature may take into account the data of a message of the transport protocol that conveys the exchanged messages such as protocol header data, the address of the message of the protocol or instead another field specific to the protocol such as for example the request line of the http protocol.

The term "protocol header" is used to differentiate it from the authentication header of the invention.

As an example, the different fields of the http protocol of the following example may be used according to one embodiment of the invention to sign the authentication header. The http request having for example the following form:

Header:
POST http://control_center_url/rest/conso HTTP/1.0
Accept: application/json
User-Agent: Mozilla/4.0 (compatible; MSIE 5.0; Windows 95)
Authorization:JohnDo:Android22434:
   1430896533037_97:C)neWaySignature_RSA-SHA256_none; w9Bgirb8 . . . .
Body of message:
{"PI"=2345,"HCHC"=29384632, "HCHP"=2936241490}

According to one embodiment, one or more data relative to the data of the transport protocol may be used. A part of a field of a header of the protocol may also be used. According to one example, the Method field of the http protocol specifying the type of request of which notably the values {GET, PUT, POST}, present in the request line of a http request has an interest for signing the authentication header TOKEN. This taking into account notably makes it possible to avoid "replay" type attacks by a third party by carrying out another action than the initial request.

According to one exemplary embodiment, a message header of an applicative transport protocol is defined by a pair {key:value}. For example, for the HTTP protocol, the header [Expires: "Sat, 7 Nov. 2015 00:59:59 GMT"] represents an expiry date of the request. According to this same protocol, the type of request and the address of the resource to interrogate are contained in the request line of the message, for example [POST http://control_center_uri/rest/conso HTTP/1.1], and may be used to generate the signature.

This embodiment is particularly advantageous for ensuring the integrity of data exchanges.

According to this same example, when the data are signed with the pair [Expires: "Sat, 7 Nov. 2015 00:59:59 GMT"], and with the type of HTTP request, which is in this case a "POST" type request, it is not possible that a replay attack re-using the same data with a different type of request or/and with a different expiry date is engaged by a third party since in this case the signature will not be recognised by the server.

The generation of a signature comprises the execution of a hashing function of the data to sign. Thus, if a third party, unauthorised, recovers a signed message, it is not possible to reconstitute the data that have been signed from the signature. The taking into account of the message identifier MES_ID, which changes at each message, in the signature makes it possible, thanks to the hashing function, to generate a signature content totally different from one message to the next.

The generation of a signature may also comprise a padding function, that is to say a data filling function.

The signature is finally generated from the private key of the client KApriv.

The communicating entities of the invention comprise means for generating a pair of asymmetric keys KApriv, KApub, the private key KApriv making it possible to generate a signature of an authentication header of a message transmitted by a communicating entity by the execution of a hashing function and a data filling function.

Data Encryption

When the option of the data encryption of a message transmitted by the client is activated, the encryption profile defines which algorithm is used to encrypt the data. The encryption profile is indicated in the authentication header TOKEN of the message and makes it possible to indicate the designation of the encryption algorithm. This designation may be encoded in the same field as the designation of the signature generation algorithm. The data of the message that are transmitted to the server are encoded with the algorithm determined by the client. The data can next be decrypted, on the server side, thanks to the indication of the algorithm used.

The data encryption algorithm may be automatically determined as a function of the equipment of the client or its operating system. One advantage is to use resources that already exist on an equipment.

An example of algorithm according to the invention may be AES designating "Advanced Encryption Standard". It is an advanced encryption standard also known by the name Rijndael. Other algorithms such as Script or Vscript may alternatively be used according to the method of the invention.

According to one embodiment, the useful data are encrypted from the public key of the server KSpub, that is to say with the public key of a second communicating entity KSpub in the general case where the server is a second communicating entity.

According to another embodiment, the data are encrypted thanks to a symmetric key and the symmetric key is itself encrypted by an asymmetric key, such as the public key of the server KSpub. This embodiment has the advantage of optimising the operations of encryption on smaller data volumes, notably relative to the size of a symmetric key instead of a size of field relative to a data content.

The security profiles may then be transposed to the situation in which it is specified if a message comprises a signed header and an encrypted content in one sense and in the return sense. An "encrypted content" then signifies in this case that it has been encrypted with a symmetric key and that the symmetric key has been encrypted with an asymmetric key.

Advantages of the Transmission of Fields in the Header

The field MES_ID makes it possible to define a security against attacks by replay of third party messages.

The field EQ_ID makes it possible to define a security when an equipment has been suspended or revoked by the server SERV.

The field USER_ID makes it possible to define a security when a user account has been suspended or revoked by the server SERV.

According to one embodiment of the invention, when a procedure of suspension or revocation of a user has been engaged by the server, the set of equipment associated with said user is also suspended or revoked.

Figure 3:
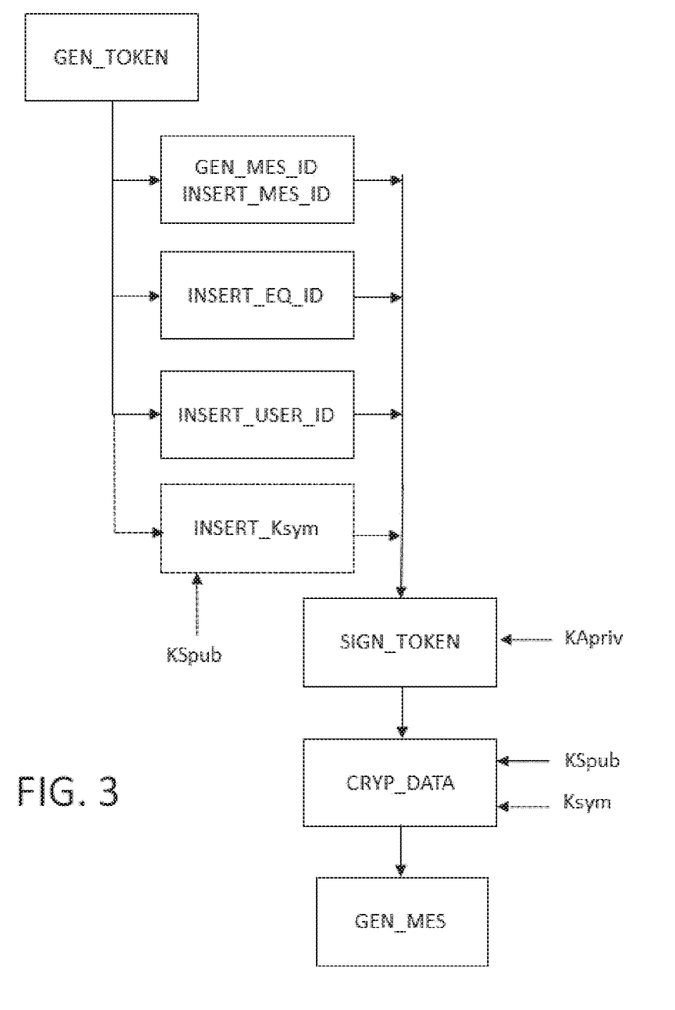
FIG. 3: the main steps of the method of communication of the invention.

FIG. 3 represents the main steps of the method of communication of the invention from the viewpoint of a communicating entity which generates a message MES.

The step of generating the TOKEN is noted GEN_TOKEN. It comprises the sub-steps of generating a message identifier GEN_MES_ID and of inserting INSERT_MES_ID this identifier into the authentication header TOKEN.

The generation of the TOKEN comprises, moreover, the insertion of an equipment identifier INSERT_ED_ID and the insertion of a user identifier INSERT_USER_ID.

The steps make it possible to generate an authentication header according to the method of communication of the invention.

When the TOKEN is signed SIGN_TOKEN, it may be signed from the private key of the client KApriv.

When an encryption is carried out CRYP_DATA, it may be encrypted from the public key KSpub of the server.

The message comprising the authentication header and the useful data may then be generated GEN_MES according to the protocol used to transmit the data between the client and the server, such as for example a HTTP protocol.

According to one alternative embodiment, as is represented in dotted lines in FIG. 3, a symmetric key Ksym may be used to encrypt the useful data during the execution of the step CRYP_DATA. In this embodiment, the symmetric key may itself be encrypted from the public key of the server KSpub and be inserted for example into the authentication header TOKEN during the step INSERT_Ksym.

Server, Management of Enrolments

The data server which corresponds to one of the communicating entities of the invention is intended to manage data transmissions with a plurality of clients. It comprises for this purpose a component making it possible to manage the equipment, it is noted EQ_MG in FIG. 1. This component makes it possible to store the encryption data of client equipment in a memory noted K_PUB which stores the public keys of the equipment KApub. This component comprises a function MG which is configured to store the client accounts and a function ENROL_S which makes it possible to receive and to process an enrolment request of an equipment. The processing of a request comprises operations of decryption of the data and verification operations aiming to verify that the equipment, the user or the received message are not suspended or revoked or that the client accounts indeed already exist.

The function MG makes it possible, moreover, to revoke or to suspend equipment or users. This action may be automatically engaged at the request of a client or at the request of an administrator of the server.

Server—Reception of a Message, Decryption

The message transmitted by the equipment is received by the server via a communication interface. A component of the server carries out a step of verification of the received message.

The server comprises a set of asymmetric keys comprising a public key KSpub and a private key KSpriv. The message received by the server has been encrypted with the public key of the server KSpub by the client. This public key of the server KSpub has been acquired beforehand by a user, for example, by means of the equipment $EQ_A$.

Server—Verification of the Message Identifier

The verification of the message comprises the control of the message identifier: MES_ID. The control of the data MES_ID comprises the verification of the date of generation of the message with a local time of the server. The date of generation of the message may be calculated from the message identifier MES_ID by a calculator and an appropriate decoding algorithm. When a discrepancy between the date decoded in the MES_ID and the local date of the server exceeds a predefined threshold, the server may engage a refusal of the received message. When the date discrepancy is below a predefined date threshold, the server may process the message on reception.

According to one embodiment, in the case of a too significant date discrepancy, the server sends back a specific error containing the current date of the server. This alternative allows the client to be able to resynchronise itself and retransmit a new valid TOKEN.

The verification of the MES_ID by the server makes it possible to limit network attacks by message replay over a longer period than the time period over which a message is validated following the analysis of the value of the data of the MES_ID.

A second verification carried out by the server consists in verifying if the message has already been received by the latter. If the message has already been received, that is to say that the MES_ID of the received message is identical to an MES_ID of a message received previously then the message is not processed by the server.

Server—Verification of Authentication, of the Client Public Key KApub

When the MES_ID of a message received by the server is not rejected, then the server carries out a step of verification of the message authentication. According to the embodiments, the server can verify alternatively the authentication data before the identifier MES_ID.

It will be recalled that the user has beforehand defined a user account comprising a user identifier and an associated password. The server SERV has stored the data of this user account in a memory.

The server executes a search for the public key of the equipment KApub in its database. The public key of the equipment KApub has been associated with the client of which the reference USER_ID is known since it has been stored following the recording of the client account.

The public key of the equipment KApub which is contained in the transmitted message is then compared with the public key of the equipment stored in the memory of the server.

When there is a correspondence of the public keys of the equipment between on the one hand that transmitted in the message and on the other hand that stored in the server, the received message may be validated. According to one embodiment, the public key of the equipment stored in the server may be used to verify that the signature is correctly authenticated, then the message may be processed by the server.

If the public key of the client KApub has been revoked or suspended or else if it is not known by the server, then the message is not processed by the server. According to one embodiment, when the signature is invalid, the message is rejected by the server.

One advantage of said solution is that the server only stores the public information of clients, that is to say the public keys of the clients KApub. The private keys of the clients are not stored by the server. Consequently, a third party accessing the database of the server cannot recover the private keys of the clients without the authorisation of the clients, Verification of the Signature When the transmitted messages are signed, the public key of the equipment KApub known by the server SERV may also be used to verify the signature comprised in the message which has been carried out from the private key of the client KApriv. The signature may be verified since the server has received the authentication data: USER_ID, EQ_ID, the message identifier MES_ID, the security profile PRO_SEC which comprises the format of the signature if need be, and the content of the message DATA. These data may be used to verify that the message has been correctly signed.

Decryption of the Message After Verifications

When the message identifier MES_ID and when the authentication of the message have been verified by the server SERV, the latter processes the field indicating the security profile that has been chosen by the client. When this profile indicates that the account of the message is encrypted, then the server engages the decryption of the useful data of the message thanks to the public key of the equipment KApub. The data are decrypted and stored in a memory or transmitted to an application processing the data.

Processing of the Message After Verification

The useful data, once decoded by the server, are transmitted to a component APP functionally processing the received message. This component makes it possible to interpret and to manage the message at the level of an applicative layer. Reciprocally, on the client side, the component APP makes it possible to process the content of the messages coming from the server when said messages have been validated and decrypted by the component SEC_SW_C.

Advantages

The method of the invention makes it possible to establish a communication in a secure manner in the form of questions/responses between a client and a server without having to manage the states of a communication, that is to say sessions between the communicating entities. Thus, the invention makes it possible to dispense with a preliminary protocol between two entities of a network or with a link aiming to prepare the conditions for a secure communication. The secure communication means exchanging data in the form of questions/responses may be implemented while respecting the principles of a REST type architecture.

The invention thus makes it possible to dispense with exchanges of data such as certificates or PKI while enabling the exchanges to be made secure. The invention thus dispenses with an implementation of a PKI infrastructure involving the management of an authentication certificate. Another advantage of the invention is to induce a low roll out cost given that the secure communication may be established between two entities discovering each other for the first time.

The solution of the invention makes it possible to suspend or to revoke an equipment by the server. Identically, the server may revoke or suspend a user account.

Another advantage of the invention is that hacking of the database of the server will not allow a third party to obtain the private keys of the equipment since it only stores public information.

Another advantage of the invention is to make it possible to tighten the association between an equipment and a user. Indeed, the method of the invention makes it possible to associate in exchanges, between the communicating entities, the user identifier USER_ID and the equipment identifier EQ_ID. The equipment has an identifier and a set of asymmetric keys and the user has a user account comprising at least one password and one identifier, consequently the hacking of one data pair does not make it possible to access the server without the other data pair.

The invention claimed is:

1. A method of communication between a first communicating entity and a second communicating entity,
wherein the first communicating entity generates at least a data message comprising useful data and an authentication header, said method performed by the first communication entity and said method comprising:
generating a message identifier from a given parameter and from a date and inserting the message identifier into the authentication header;
inserting a plurality of authentication data comprising at least one user identifier and one equipment identifier into the authentication header;
determining and inserting a security profile into the authentication header defining:
conditions of encryption, in an encryption parameter, of the useful data of the data message by the first communicating entity; and
conditions of generation of a signature, in a signature parameter, of the data message and the format of said generated signature;
inserting the useful data into the data message to be transmitted,
wherein the second communicating entity on receiving said data message from the first communicating entity decodes the authentication header to:
control the message identifier to determine if the data message has been transmitted in a predefined time lapse;
control the user identifier and the equipment identifier by comparing values of said user and equipment identifiers with data stored in a memory of the second communicating entity to determine if an equipment associated with the equipment identifier or a user associated with the user identifier has been suspended or revoked;
control the encryption parameter of the security profile of said data message received to decrypt the useful data with a private key of the second communicating entity;
control the signature parameter of the security profile of said data message received to verify the signature by means of a public key of the first communicating entity.

2. The method of communication according to claim 1, wherein a data set of the data message to sign comprises a combination of the following data:
the message identifier;
the user identifier;
a password of a user account;
the equipment identifier;
the security profile;
an information representative of the useful data transfer protocol;
the useful data.

3. The method of communication according to claim 1, wherein the first communicating entity comprises a memory for storing a public key of the second communicating entity, and wherein the security profile comprises:
the encryption parameter indicating the presence or not of the encryption of the useful data carried out by the public key of the second communicating entity, and
the signature parameter indicating the presence or not of a signature of the data set to sign.

4. The method of communication according to claim 1, wherein the first communicating entity comprises a memory for storing a public key of a second communicating entity, and wherein the security profile comprises:
the encryption parameter indicating the presence or not of the encryption of the useful data carried out by a symmetric key and of the presence of an encryption of the symmetric key by the public key of the second communicating entity, and
the signature parameter indicating the presence or not of a signature of the data set to sign.

5. The method of communication according to claim 3, wherein the security profile comprises:
a third parameter indicating the presence or not of an encryption carried out by the public key of the first communicating entity either of the useful data or of a symmetric key, and a fourth parameter indicating the presence or not of a signature of a data set to sign, of at least one message having to be transmitted by a second communicating entity in response to a message received from the first communicating entity.

6. The method of communication according to claim 1, wherein the second communicating entity comprises means for accessing the memory storing the data corresponding to the client identifiers and to the equipment identifiers to revoke or suspend one or more equipment or clients.

7. A method comprising:
performing a method of communication between a first communicating entity and a second communicating entity, wherein the first communicating entity generates at least a data message comprising useful data and an authentication header, said method of communication being performed by the first communication entity and said method of communication comprising
generating a message identifier from a given parameter and from a date and inserting the message identifier into the authentication header;
inserting a plurality of authentication data comprising at least one user identifier and one equipment identifier into the authentication header;
determining and inserting a security profile into the authentication header defining:
conditions of encryption, in an encryption parameter, of the useful data of the data message by the first communicating entity; and
conditions of generation of a signature, in a signature parameter, of the data message and the format of said generated signature;
inserting the useful data into the data message to be transmitted,
wherein the second communicating entity on receiving said data message from the first communicating entity decodes the authentication header to:
control the message identifier to determine if the data message has been transmitted in a predefined time lapse;
control the user identifier and the equipment identifier by comparing values of said user and equipment identifiers with data stored in a memory of the second communicating entity to determine if an equipment associated with the equipment identifier or a user associated with the user identifier has been suspended or revoked;
control the encryption parameter of the security profile of said data message received to decrypt the useful data with a private key of the second communicating entity;
control the signature parameter of the security profile of said data message received to verify the signature by means of a public key of the first communicating entity,
wherein, prior to performing the method of communication between the first communicating entity and the second communicating entity, the method comprises generating an enrolment request by the first communicating entity destined to the second communicating entity, the generation of the enrolment request comprising:
activating an enrolment procedure;
generating an enrolment request comprising the equipment identifier, the user identifier, a password of the user and the public key of the first communicating entity; and encrypting the enrolment request with a public key of the second communicating entity and transmitting the enrolment request by means of a communication interface destined to the second communicating entity.

8. The method according to claim 7, wherein, prior to performing the method of communication between the first communicating entity and the second communicating entity, the method comprises:
creating a user account comprising the user identifier and the password of the user;
recording the data of said user account in the memory of the second communicating entity;
acquiring the public key of the second communicating entity for which the enrolment procedure is engaged from the first communicating entity;
generating a pair of asymmetric keys of the first communicating entity.

9. A method comprising:
performing a method of communication between a first communicating entity and a second communicating entity, wherein the first communicating entity generates at least a data message comprising useful data and an authentication header, said method of communication being performed by the first communication entity and said method of communication comprising
generating a message identifier from a given parameter and from a date and inserting the message identifier into the authentication header;
inserting a plurality of authentication data comprising at least one user identifier and one equipment identifier into the authentication header;
determining and inserting a security profile into the authentication header defining:
conditions of encryption, in an encryption parameter, of the useful data of the data message by the first communicating entity; and
conditions of generation of a signature, in a signature parameter, of the data message and the format of said generated signature;
inserting the useful data into the data message to be transmitted,
wherein the second communicating entity on receiving said data message from the first communicating entity decodes the authentication header to:
control the message identifier to determine if the data message has been transmitted in a predefined time lapse;
control the user identifier and the equipment identifier by comparing values of said user and equipment identifiers with data stored in a memory of the second communicating entity to determine if an equipment associated with the equipment identifier or a user associated with the user identifier has been suspended or revoked;
control the encryption parameter of the security profile of said data message received to decrypt the useful data with a private key of the second communicating entity;
control the signature parameter of the security profile of said data message received to verify the signature by means of a public key of the first communicating entity,
wherein, prior to performing the method of communication between the first communicating entity and the second communicating entity, the method comprises generating an enrolment request by the first communicating entity destined to the second communicating entity, the generation of the enrolment request comprising:
  activating an enrolment procedure;
  generating an enrolment request comprising the equipment identifier, the user identifier, a password of the user and the public key of the first communicating entity; and
  encrypting the enrolment request with a public key of the second communicating entity and transmitting the enrolment request by means of a communication interface destined to the second communicating entity, and
wherein the second communicating entity:
  receives the enrolment request;
  decrypts the data of the enrolment request by means of the private key of the second communicating entity;
  compares the user identifier received and the user password received with the data of client accounts stored in the memory of the second communicating entity;
  records the equipment identifier in the memory of the second communicating entity; and
  records the public key of the first communicating entity associated with the equipment identifier in the memory of the second communicating entity.

10. The method of enrolment according to claim 9, wherein the second communicating entity:
  controls a current date with a reference date;
  generates a message destined for the first communicating entity comprising a specific code indicating that a pair of asymmetric keys has to be renewed;
  receives a new enrolment request generated by the first communicating entity.

11. Communicating entities comprising at least one memory, one calculator and one communication interface for the execution of a method of communication according to claim 1.

12. A physical memory comprising a set of instructions for the implementation of a method of communication of claim 1.

13. Communicating entities comprising at least one memory, one calculator and one communication interface for the execution of the method according to claim 7.

* * * * *